United States Patent [19]

McPhail

[11] Patent Number: 5,146,876
[45] Date of Patent: Sep. 15, 1992

[54] SHOCK ABSORBER LEASH

[76] Inventor: Gregory E. McPhail, HCO1 Box 610, Ilwaco, Wash. 98624

[21] Appl. No.: 800,129

[22] Filed: Nov. 29, 1991

[51] Int. Cl.⁵ ............................................. A01K 27/00
[52] U.S. Cl. ........................................ 119/109; 54/34
[58] Field of Search ............... 119/109, 106, 117, 153; 54/34; 114/215; 280/480

[56]  References Cited

U.S. PATENT DOCUMENTS

| | | | |
|---|---|---|---|
| 536,511 | 3/1895 | Cornell | 54/34 |
| 729,912 | 6/1903 | Andrews | 119/117 |
| 986,973 | 3/1911 | Gordon | 54/34 |
| 1,924,596 | 8/1933 | Davis | 119/109 |
| 2,275,701 | 3/1942 | Taylor | 119/109 |
| 2,737,154 | 3/1956 | Michonski | 119/109 |
| 2,911,947 | 11/1959 | Kramer | 119/109 |
| 3,884,190 | 5/1975 | Gurry | 119/109 |
| 4,488,511 | 12/1984 | Grassano | 119/109 |
| 4,993,366 | 2/1991 | Sager | 119/109 |

FOREIGN PATENT DOCUMENTS

| 15304 | of 1910 | United Kingdom | 119/106 |
|---|---|---|---|
| 426081 | 3/1935 | United Kingdom | 119/109 |

Primary Examiner—Robert P. Swiatek
Assistant Examiner—Todd E. Manahan
Attorney, Agent, or Firm—Richard C. Litman

[57]  ABSTRACT

An extensible elastic leash attenuates physical forces generated between the pet and the owner. The leash tempers the impulse forces and makes them more manageable, allowing both the owner and the pet to walk and run without discomfiture. This leash has both elastic and non-elastic members, the elastic member is parallel to a first non-elastic member and when the elastic member is at its full extension the length of the elastic member and the parallel first non-elastic member are the same. The elastic member is further connected to a second non-elastic member which is elongated and has a clip at its distal end to connect to the collar of a pet.

5 Claims, 2 Drawing Sheets

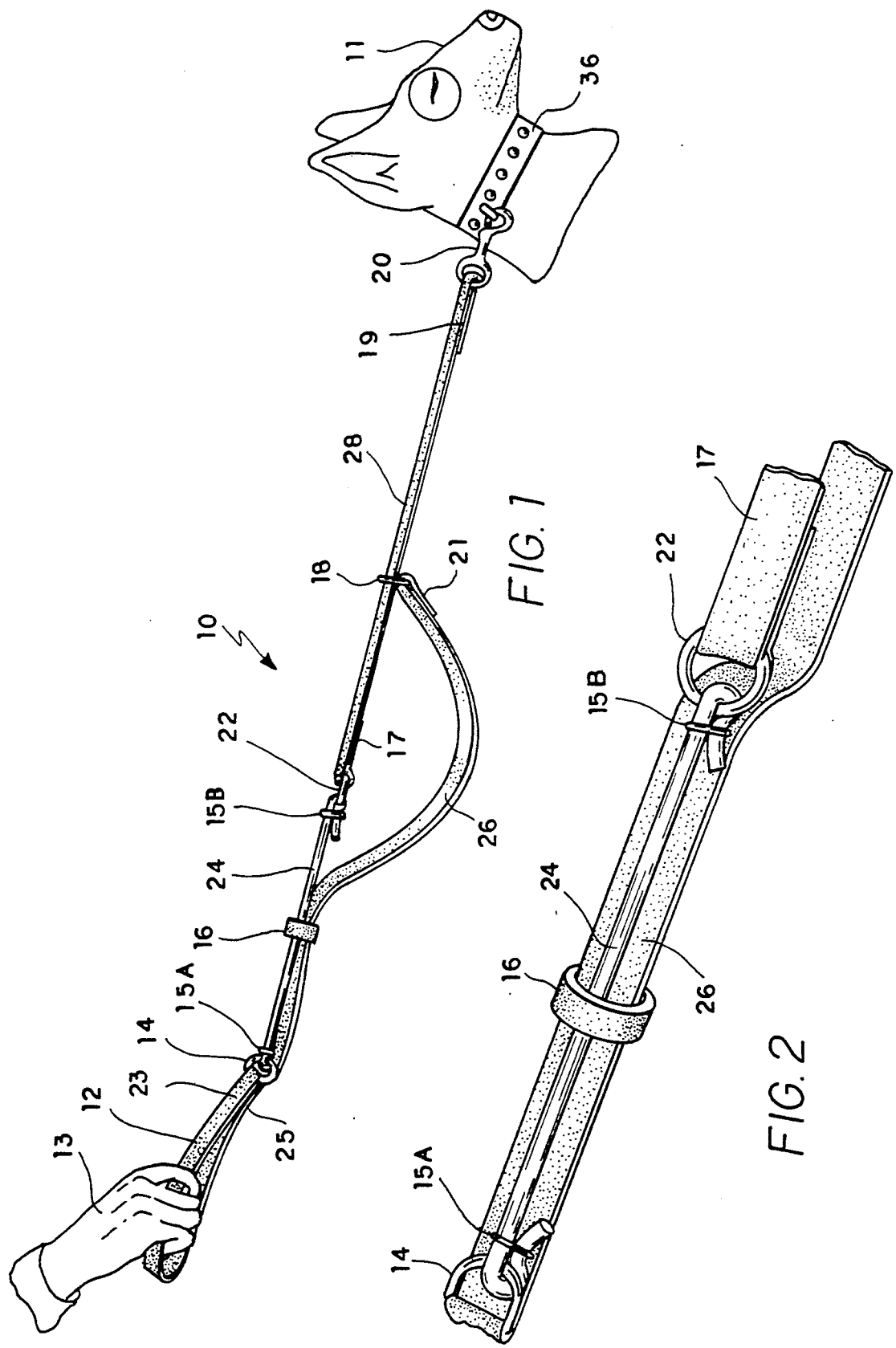

SHOCK ABSORBER LEASH

FIELD OF THE INVENTION

The present invention concerns leashes for the restraint of pets. More particularly the invention relates to a leash for a pet with a elastic cord member which attenuates (absorbs) shock as the animal pulls away.

DESCRIPTION OF THE PRIOR ART

Animal leashes with a shock reducing capacity are known in the art U.S. Pat. No. 1,924,596 issued to Harry Davis on Aug. 29, 1933 discloses an animal leash. The animal leash is a single elongated cable formed of a strong flexible elastic substance such as rubber.

U.S. Pat. No. 2,275,701 issued to Charles Taylor on Mar. 10, 1942 discloses a dog leash. A tubular sheath encircles an elastic leash strap. The strap is nested in the tubular member which has a handle mounted on the top end and a clip mounted on the bottom end to engage a collar of an animal.

U.S. Pat. No. 2,737,154 issued to George Michonski on Mar. 6, 1956 discloses an expansible dog leash. The leash consists of a handle connected to an elastic cord, the cord having a clip mounted on its end for engaging the collar of an animal.

U.S. Pat. No. 2,911,947 issued to Nelson Kramer on Nov. 10, 1959 discloses a dog leash. A handle is connected to a helical spring coil which in turn has a clip mounted on its end for engaging the collar of the dog.

U.S. Pat. No. 3,884,190 issued to Richard Gurrey on May 20, 1975 discloses a resiliently extensible coiled leash. The animal leash is self coiling and is comprised of music wire surrounded by a flexible sheath. A handle and a clip are provided.

U.S. Pat. No. 4,993,366 issued to Thomas Sager on Feb. 19, 1991 discloses a leash. The leash consists of a non-elastic tubular member which houses an elastic bungee cord. The bungee cord is attached inside the non-elastic tubular housing.

None of the above referenced devices, considered either singly or in combination, is seen to suggest the instant invention as claimed.

SUMMARY OF THE INVENTION

The present invention concerns leashes for the restraint of pets. Generally speaking, a leash consisting of a non-elastic line will impart sudden forces to both the pet and the owner. Especially with large pets, these forces can be significant. The present invention basically is four components. First, a handle made of non-elastic material is provided. This in turn is connected to a bungee cord and a first non-elastic line in parallel relation. The bungee cord is much shorter than the non-elastic line which it is parallel to. The bungee cord is then permanently affixed to a second non-elastic line which has a clip at its end to mount to the collar of the pet. The first non-elastic line is connected to the second non-elastic line by a ring which allows the first non-elastic line to move freely on the second non-elastic line. When the bungee cord is fully extended it is of equal length to the first non-elastic line.

Accordingly, one object of the present invention is to provide a pet leash with a shock absorbing capacity.

Another object of this invention is to provide a pet leash which minimizes forces on both the pet and the owner.

These and other objects of the present invention will become easily apparent upon further review of the following specification and drawings.

BRIEF DESCRIPTION OF THE DRAWINGS

FIG. 1 is an environmental perspective view of the shock absorbing leash;

FIG. 2 is a partial view of the shock absorbing leash showing the bungee cord;

Similar reference characters denote corresponding features consistently throughout the attached drawings.

DETAILED DESCRIPTION OF THE PREFERRED EMBODIMENT

Figure 3:
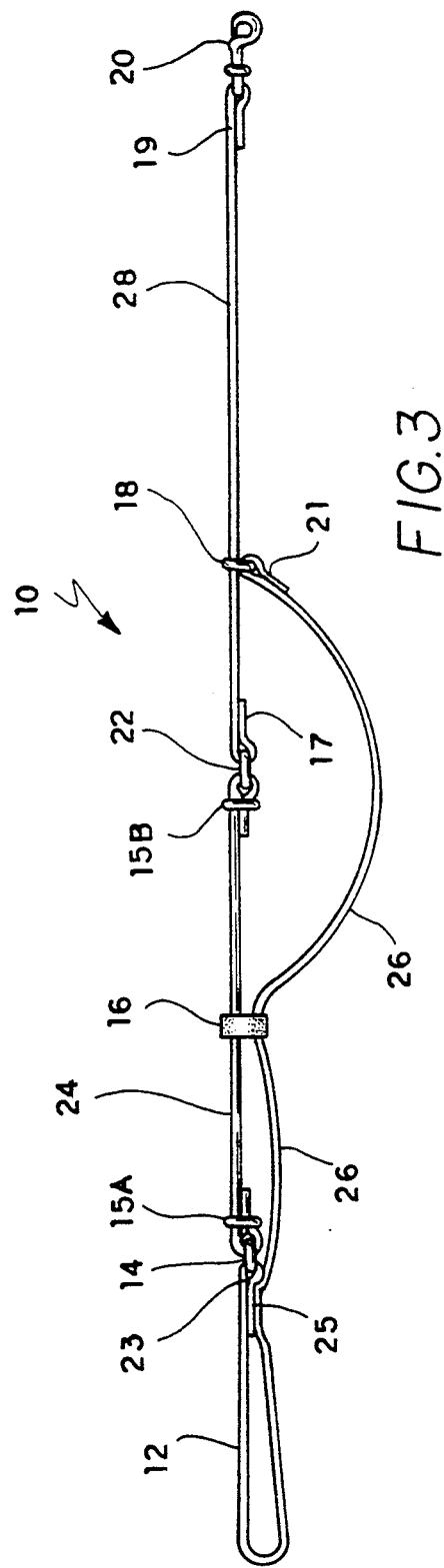
FIG. 3 is a side view of the shock absorbing leash in its non-extended position.

The present invention is shock absorbing leash 10. Referring now to FIG. 1, the leash 10 is connected to a collar 36 about a pet's neck by a clip 20. The owner 13 holds handle 12 in his hand. Intermediate the dog 11 and the owner 13 is the shock absorbing mechanism. An elastic cord 24 is secured to the handle 12 by a D-ring 14. A small loop is formed at the end of the elastic cord 24 and is held in place by a first securing clip 15A. A first strap 26 is connected by a loop 23 to the handle 12 and runs parallel to the elastic cord 24. The first strap 24 has a first guide element 16 through which the elastic cord 24 is threaded. The elastic cord 24 is further secured to a second strap 28 by an O-ring 22. Again a small loop is formed at the end of the elastic cord 24 and is held in place by a second securing clip 15B. At the distal end of the first strap 26 a second guide element 18 is located. The first strap 26 is connected to the guide element by loop 21. The second guide element 18 is a rectangular ring and slides freely over the second strap 28. The second strap 28 is connected to a clip 20 by loop 19. The second strap 28 is connected to the O-ring 22 by loop 17.

FIG. 2 shows a partial view of the shock absorbing portion of the leash which focus is on elastic cord 24. Elastic cord 24 is connected to D-ring 14 and to O-ring 22 by two small loop sections which are held by connecting clips 15A and 15B respectively.

Figure 4:
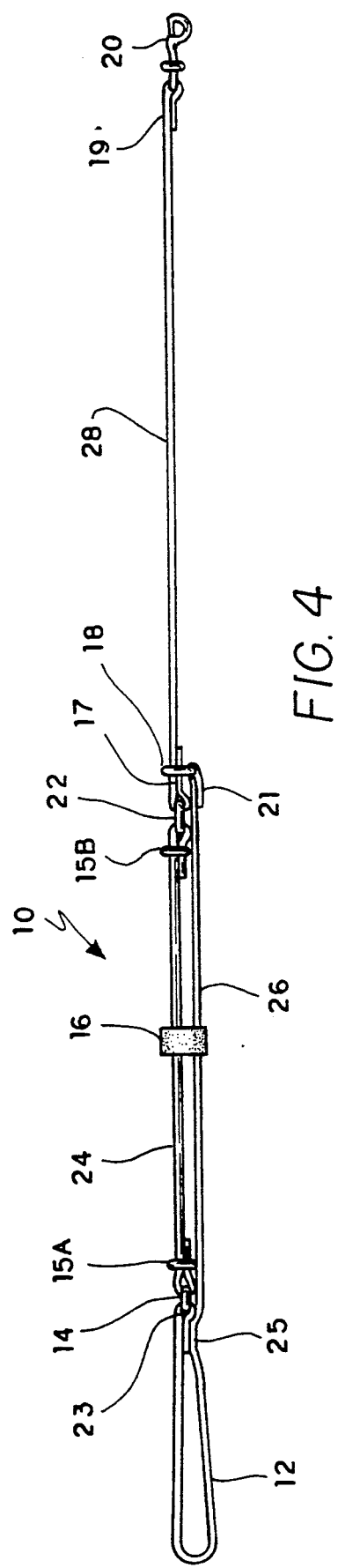
FIG. 4 is a side view of the shock absorbing leash in its fully extended position.

FIGS. 3 and 4 show the shock absorbing leash 10 in its fully relaxed state (FIG. 3) and its fully extended state (FIG. 4). Note how the length of extension of the elastic cord 24 is governed by the first strap 26.

It is to be understood that the present invention is not limited to the sole embodiment described above, but encompasses any and all embodiments within the scope of the following claims.

I claim:

1. An extensible pet leash comprising:
   a handle formed at one end of an elongated first strap;
   a first means for guiding mounted on said first strap between said handle and a second end of said first strap;
   an elastic cord having a means for connecting at both ends thereof, one of said means for connecting being attached to said handle, the other of said means for connecting being attached to a first end of a second elongated strap, said elastic cord being threaded through said first means for guiding;
   said second end of said first strap having a second means for guiding attached thereto, said second elongated strap being threaded through said second means for guiding located along said second elongated strap at a suitable distance from said other of said means for connecting attached to said first end of said second elongated strap; and said second elongated strap having a clip attached to a second end thereof for connecting said leash to a pet collar; whereby when a pet connected to said leash pulls on said leash, said elastic cord will increase in length until the other of the said means for connecting engages said second means for guiding, thereby providing an extensible pet leash for absorbing forces placed on said leash by a tethered pet.

2. An extensible pet leash as claimed in claim 1 wherein said first correcting means is secured to said handle by a first loop.

3. An extensible pet leash as claimed in claim 1 wherein said second means for guiding is connected to said first strap by a second loop.

4. An extensible pet leash as claimed in claim 1 wherein said elastic cord has a first and second elastic cord securing clips, said first and second clips securing both ends of said elastic cord and forming first and second elastic cord loops, said first and second elastic cord loops being connected to said one of said means for connecting and said other of said means of connecting, respectively.

5. An extensible pet leash comprising;

a first elongated strap having a first end and a second end, a handle being provided at said first end, a first means for guiding being provided at said second end, and an intermediate means for guiding being provided between said first and second ends;

a second elongated strap having a first end and a second end, a first means for connecting mounted on said first end of said second elongated strap, and a clip mounted on said second end of said second elongated strap;

said handle including a second means for connecting; and an elastic cord connected between said first means for connecting and said second means for connecting; whereby when a pet, connected to said leash, pulls on said leash, said elastic cord will stretch and said extensible leash will expand until said first means for connecting on said first end of said second elongated strap engages said first means for guiding on said second end of said first elongated strap, thereby absorbing forces placed on said extensible pet leash by a tethered pet.

* * * * *